(12) United States Patent
Mairesse et al.

(10) Patent No.: US 10,029,225 B2
(45) Date of Patent: Jul. 24, 2018

(54) SUPPLYING A DISPENSING DEVICE FOR LOADING A REFINERY AND/OR PETROCHEMICAL REACTOR WITH SOLID PARTICLES

(71) Applicant: TOTAL RAFFINAGE CHIMIE, Courbevoie (FR)

(72) Inventors: Julien Mairesse, La Reole (FR); Guillaume Berric, Fontiane-la-Mallet (FR); Xavier Boce, Le Havre (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 7 days.

(21) Appl. No.: 14/786,759

(22) PCT Filed: May 20, 2014

(86) PCT No.: PCT/FR2014/051160
§ 371 (c)(1),
(2) Date: Oct. 23, 2015

(87) PCT Pub. No.: WO2014/191652
PCT Pub. Date: Dec. 4, 2014

(65) Prior Publication Data
US 2016/0067664 A1  Mar. 10, 2016

(30) Foreign Application Priority Data

May 30, 2013  (FR) ...................................... 13 54904

(51) Int. Cl.
*B01J 8/00* (2006.01)
*B65B 1/06* (2006.01)

(52) U.S. Cl.
CPC .............. *B01J 8/003* (2013.01); *B01J 8/002* (2013.01); *B01J 8/0035* (2013.01); *B65B 1/06* (2013.01);
(Continued)

(58) Field of Classification Search
CPC ........... B01J 8/002; B01J 8/003; B01J 8/0035
(Continued)

(56) References Cited

U.S. PATENT DOCUMENTS 2,956,840 A * 10/1960 Mead ................. B65G 53/4675
406/127
4,030,640 A *  6/1977 Citrin .................... B05C 5/0225
141/117
(Continued)

FOREIGN PATENT DOCUMENTS

EP       1 041 022 A1   10/2000
EP       1 127 816 A2    8/2001
(Continued)

OTHER PUBLICATIONS

International Search Report for PCT/FR2014/051160 dated Jun. 3, 2015.
(Continued)

*Primary Examiner* — Timothy L Maust
(74) *Attorney, Agent, or Firm* — Sughrue Mion, PLLC

(57) ABSTRACT

An assembly for loading a refinery and/or petrochemical reactor (100) with solid particles, comprising a dispensing device (110) for loading the reactor with solid particles in a relatively uniform manner, a system (200) for supplying the dispensing device, comprising a flexible sleeve (140) connected to a solid particle tank (130) and to the dispensing device, and a control system (300) comprising a blocking device (310) for blocking the particles flowing in the flexible sleeve, adjacent to a portion (141) of the flexible sleeve and capable, when activated, of moving the walls of the flexible sleeve in such a way as to reduce a cross section of said sleeve at said portion, and an actuating device (350) for actuating the blocking device located at a distance from the blocking device.

11 Claims, 3 Drawing Sheets

Figure 4:
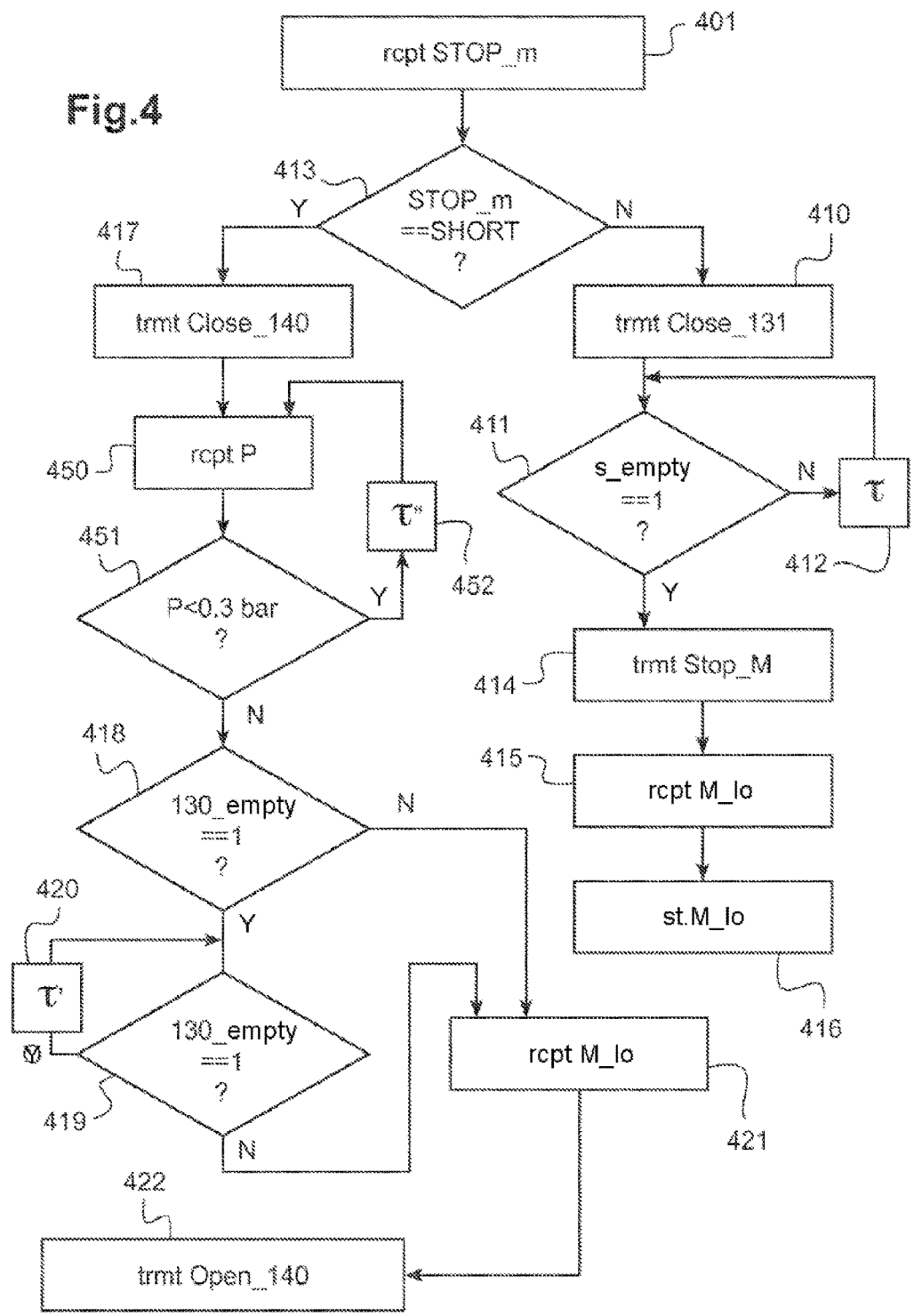

(52) U.S. Cl.
CPC ............... *B01J 2208/00752* (2013.01); *B01J 2208/00778* (2013.01)

(58) Field of Classification Search
USPC .................................................. 141/287, 302
See application file for complete search history.

(56) References Cited

U.S. PATENT DOCUMENTS

| | | | | |
|---|---|---|---|---|
| 4,286,910 | A * | 9/1981 | Conrad | B65G 53/4675 100/221 |
| 4,424,837 | A * | 1/1984 | Farrell | B01J 8/002 141/284 |
| 4,972,884 | A * | 11/1990 | Souers | B65G 69/0458 141/1 |
| 5,105,981 | A * | 4/1992 | Gehman | B65D 90/56 222/1 |
| 5,265,654 | A * | 11/1993 | Larsen | B65B 3/30 141/114 |
| 5,950,694 | A * | 9/1999 | Jama | B01J 8/002 141/285 |
| 6,293,426 | B1 * | 9/2001 | Papera | B65G 11/206 141/287 |
| 9,079,145 | B2 * | 7/2015 | Baranowski | B01J 8/003 |
| 2008/0216918 | A1 | 9/2008 | Comardo et al. | |

FOREIGN PATENT DOCUMENTS

| | | |
|---|---|---|
| EP | 1 127 816 A3 | 6/2005 |
| FR | 2 771 721 A1 | 6/1999 |
| FR | 2 949 755 A1 | 3/2011 |
| JP | 50-21326 | 3/1975 |
| JP | 54-80132 | 11/1977 |
| JP | 03-85768 | 8/1991 |
| JP | 10-66858 | 3/1998 |
| WO | 2010/076522 A1 | 7/2010 |

OTHER PUBLICATIONS

Chinese Office Action dated Apr. 13, 2018 by the State Intellectual Property Office of China in corresponding Chinese Patent Application No. 201480030325.2.

Notice of Reasons for Rejection dated Feb. 20, 2018 issued by the Japanese Patent Office in corresponding Japanese Application No. 2016-516216.

* cited by examiner

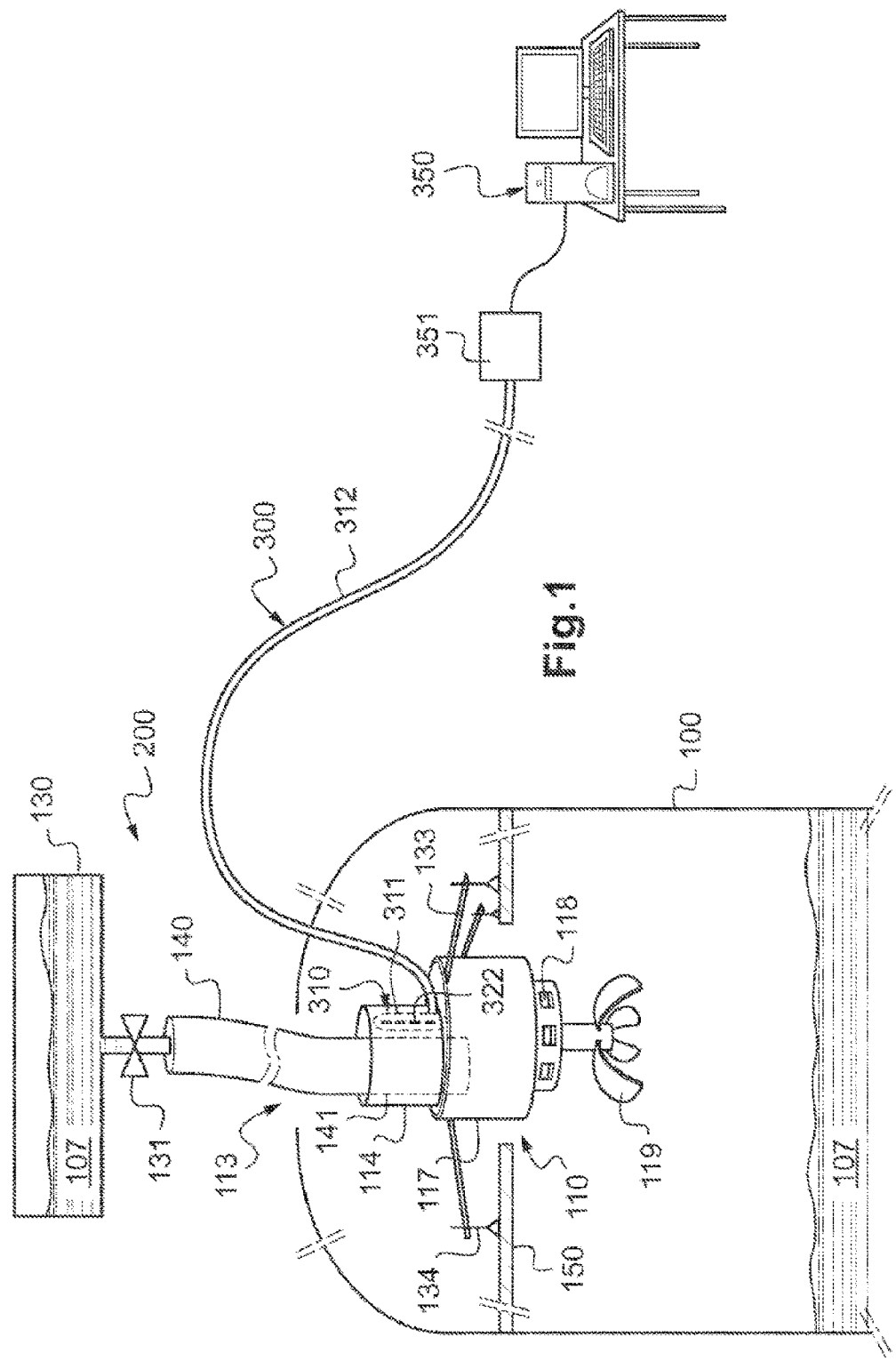

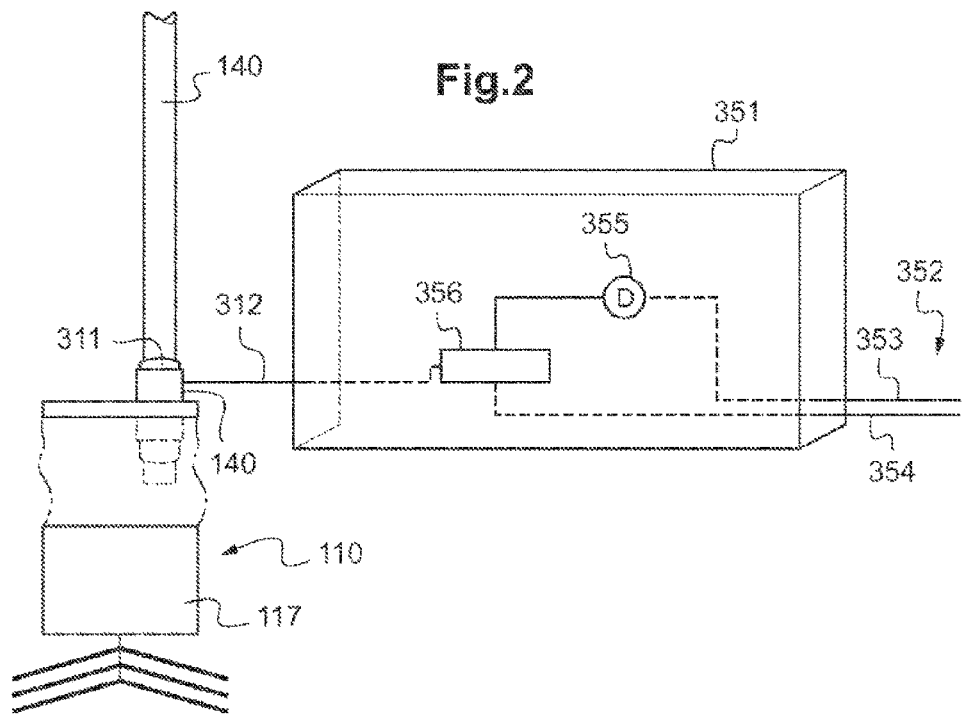
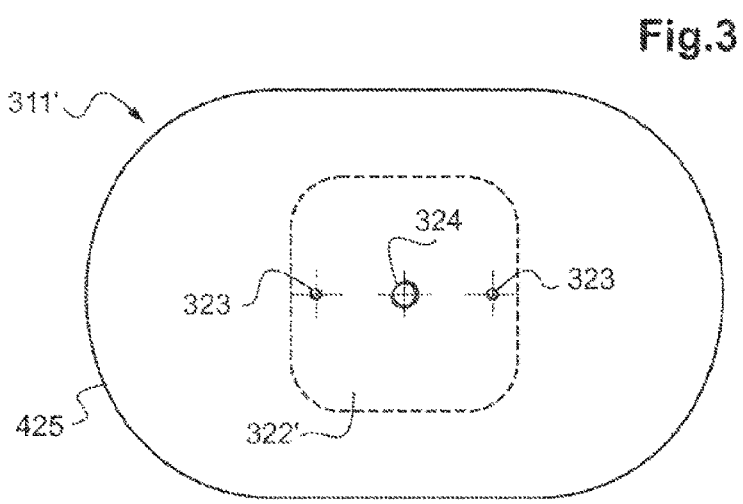

SUPPLYING A DISPENSING DEVICE FOR LOADING A REFINERY AND/OR PETROCHEMICAL REACTOR WITH SOLID PARTICLES

CROSS REFERENCE TO RELATED APPLICATIONS

This application is a National Stage of International Application No. PCT/FR2014/051160 filed May 20, 2014, claiming priority based on French Patent Application No. 13 54904, filed May 30, 2013, the contents of all of which are incorporated herein by reference in their entirety.

The invention relates to supplying a dispensing device for loading a refining and/or petrochemical reactor with solid particles.

It is known to load reactors of this type with solid particles in the divided state. These particles can, for example, be in the form of beads, grains, cylinders, pellets, rods, or any other form and generally have relatively small dimensions, for example in the centimeter range.

The particles can be, in particular, solid catalyst grains, which are generally extruded, produced either in regular form, or in the form of mono-lobe or multi-lobe rods, the dimensions which can vary, from case to case, from a few tenths of a millimeter to a few centimeters. It is to this use, called "dense loading", of grains of catalysts in a refining and/or petrochemical reactor, that reference will be made more particularly in the remainder of the present description, but the device described can more generally be used in the context of loading solid particles into a reactor.

"Dense loading" means optimized rain effect loading in order to allow loading, in a minimum amount of time, of a maximum amount of solid particles in a manner that is homogenous and the most uniform possible.

The document WO 2010/076522, in the name of the Applicant, describes an example of a device for dispensing solid particles into a reactor. This dispensing device is fitted in a reactor filling opening located at the top of the reactor and in the center of the reactor.

It is known to connect a device for dispensing solid particles to a reserve of solid particles, by means of a flexible pipe or flexible sleeve, such that the solid particles can flow from the reserve towards the loading device, in the flexible sleeve, simply due to gravity. Since the walls of the sleeve are flexible and conventionally easily divisible by means of scissors or other means, the length of the sleeve is relatively easy to adjust. The use of a flexible sleeve therefore allows for adjustment to various configurations between the reserve, for example a hopper, and the loading device.

Conventionally, to block the loading of solid particles, an operator stands proximate the flexible sleeve, inside the reactor, and closes the sleeve by means of a string. During such loading stoppages, the operator, furthermore, checks the quantity of loaded particles.

There is a requirement for a system allowing for greater safety for the operator.

It has been envisaged to provide a valve to close an outlet of the hopper. Nevertheless, if an operator closes this valve at the hopper, the particles already in the sleeve will continue to fall and reach the dispensing device. In other words, the reactor will be loaded for a relatively long duration, i.e. the time for the flexible sleeve to empty.

An assembly for loading a refining or petrochemical reactor with solid particles is proposed, this assembly comprising:

a dispensing device for loading the reactor with solid particles, said device being arranged such as to homogenize and/or make uniform the loading of solid particles into the reactor, a system for supplying the dispensing device, the supply system comprising a flexible sleeve intended to be connected to a solid particle reserve firstly, and connected to the dispensing device secondly, wherein the solid particles can flow, generally from the top to the bottom, a system for controlling the supply system, comprising:
a device for blocking the solid particles flowing in the flexible sleeve, which device is adjacent to a portion of the flexible sleeve and arranged to, when activated, move walls of the flexible sleeve such as to reduce an effective cross-section of this sleeve at said portion, and
a device for actuating the blocking device located remotely from the blocking device.

Therefore, by providing means that can be actuated remotely, and that can move the walls of the flexible sleeve at a section such as to reduce this section, and advantageously such as to sufficiently reduce this effective cross-section in order to block the passage of the solid particles, it is possible to allow the operator to move away from the pipe and to simply stand at the device for actuating the blocking device.

Furthermore, it is possible to position the blocking device relatively close to the dispensing device, such that, in the case of blocking the particles at the flexible sleeve portion adjacent to the blocking device, the dispensing device quickly stops being supplied.

Likewise, during start-up, it is possible to load the part of the sleeve upstream of the blocking device with solid particles, the flexible sleeve having a reduced effective cross-section at this device. Once the sleeve has been loaded, the sleeve can be opened, which allows a loading constant rate to be reached relatively quickly, and therefore a specific loading quality to be provided.

The solid particles can advantageously comprise catalyst particles and/or inert beads.

The dispensing device can be arranged such as to, optionally, allow perfectly homogenous and uniform loading. In particular, the loading device can be arranged simply such as to improve the homogeneous nature and/or the uniform nature of loading, compared to loading which would be obtained with a simple nozzle outlet.

The dispensing device can comprise means for distributing the solid particles, in order to give the solid particles a speed with a component perpendicular to the vertical direction, in order to make loading more uniform and homogenous. These distributing means can, for example, comprise:
blades, for example flexible straps, and possibly, particularly when these blades have an end fixed to a vertical shaft, a motor to rotate these blades about a vertical axis, and/or
orifices opening radially.

The invention is in no way limited to a specific form of the distributing means.

The distributing device can advantageously further comprise sensors to monitor the loading state, and actuators for acting upon the distributing means depending on the measurements coming from the sensors.

"Remotely" means that the distance between the actuating device and the blocking device is greater than or equal to the radius of the base of the reactor. Therefore, the operator can stand relatively far from and outside the reactor during loading.

The actuating device can, for example, comprise a computer of a control station behind which the operator can stand.

In an advantageous embodiment, the blocking device can be arranged such as to urge at least some of the walls of the flexible sleeve against the other walls, when it is actuated.

Advantageously, the blocking device can be arranged such as to urge the walls of the flexible sleeve against a rigid or semi-rigid supporting means.

Advantageously, the supply system can, indeed, further comprise a rigid (or semi-rigid, for example made from semi-rigid plastic) pipe through which the flexible sleeve passes. For example, this pipe can optionally be connected to the dispensing device.

Therefore, the blocking device can be arranged such as to press the walls of the flexible sleeve flat against the rigid pipe.

The blocking device can, advantageously, comprise an urging element, intended to come into contact with the flexible wall and move this flexible wall, for example a shank-type rigid element, a balloon-type inflatable element, etc.

The blocking device can, for example, comprise a shank (of a piston or jack system for example) which can be moved in a direction transverse to a longitudinal direction of the flexible sleeve, in order to urge the flexible sleeve against the rigid pipe. It is possible to fix, to the end of this shank, a support member extending transversely in relation to the longitudinal direction of the shank, such that the contact between the shank and the flexible sleeve is relatively extensive and not localized.

Advantageously, the blocking device can be suitable for passing, when actuated, from an inactive state, wherein the effective cross-section of the flexible sleeve remains relatively high, to an active state, wherein this device moves the walls of the flexible sleeve such as to reduce the effective cross-section of this sleeve.

Advantageously, the device can be also suitable to pass from the active state to the inactive state, following a command or an absence of command coming from the actuating device. The system can be arranged such that, when the blocking device passes from the active state to the inactive state, the walls of the flexible sleeve move such as to enlarge the effective cross-section and allow the particles to pass.

The system can be arranged to support several cycles for passing from the active state to the inactive state then to the active state. In other words, the operator can choose to stop and to restart loading when desired and for as many times as the latter wishes.

The actuation of the blocking device can be pneumatic and/or electric. A pneumatic actuation can, however, prove to be particularly judicious when the environment is that of an explosive atmosphere, as can be the case in a refinery. A pneumatic actuation can, particularly, allow safety requirements, for example the ATEX regulation (explosive atmospheres), etc., to be met relatively easily.

In an advantageous embodiment, the blocking device can comprise a balloon element pneumatically connected to a gas supply pipe.

Therefore, when a command is issued for the admission of air into the balloon, the balloon inflates and therefore urges the flexible sleeve against the walls of the rigid pipe such that the solid particles remain blocked.

The balloon element can be advantageous in that it is relatively light and compact in the inactive state.

Advantageously and in a nonlimiting way, when the blocking device comprises a balloon, this balloon can be connected to a pneumatic network by means of a single pipe. It will be possible, for example, to provide an air distributing element to connect this pipe to an air admission pipe and to an air escape pipe. Therefore, the spatial requirement at the balloon remains reduced, therefore allowing space to be left clear for a possible human intervention.

In an alternative embodiment, it would be possible, of course, to provide a balloon defining an inlet for the admission of air and an outlet for the evacuation of air.

Advantageously and in a nonlimiting manner, the balloon can comprise two planar parts made from a flexible material, which are connected with one another in a sealed manner, for example two parts made from poly(p-phenylene terephtalamide) or Kevlar®.

The rigid connection can be obtained by welding, etc. Therefore, when the balloon is deflated, it remains relatively flat.

Furthermore, by selecting a relatively rigid material such as Kevlar®, it is possible to know the volume of the inflated balloon relatively accurately, this volume remaining relatively stable over time.

Of course, the invention is not limited to this type of balloon and it would be absolutely possible to select a flexible material, for example rubber, blown balloon.

Advantageously and in a nonlimiting manner, the blocking device can further comprise a sheet metal element, with a generally planar shape, inside the balloon. This sheet metal element can allow it to be ensured that, in the deflated state, the balloon element is indeed flat.

The actuating system can comprise a pump element, which can provide pressurized gas, for example air, a vacuum pump element for deflating the balloon, a pressure gauge element for monitoring the pressure, an air pressure reducing valve element in order to prevent the pressurized air intended to fill the balloon from having an excessively high pressure compared to that which could be supported by the balloon, and/or other element.

The invention is, of course, not limited to a blocking device arranged to urge the walls against one another.

The blocking device could, for example, comprise a cord suitable for surrounding the flexible sleeve on a given section, and a ring, the cord being sufficiently long to be pulled at a distance, such that when the operator pulls on the two ends of the cord, the walls of the flexible sleeve close in and prevent the solid particles from passing.

It is furthermore proposed to use the assembly described above to manage the loading of a refining and/or petrochemical reactor with solid particles.

Advantageously, the solid particles can be catalyst particles and/or inert beads.

Furthermore, a method of controlling a system for supplying a dispensing device for loading a refining and/or petrochemical reactor with solid particles is proposed, the dispensing device being arranged such as to homogenize and make uniform the loading of solid particles, this supply system comprising a flexible sleeve intended to be connected firstly to a reserve of solid particles and secondly to the dispensing device, and wherein the solid particles can flow, generally from the top to the bottom. The method comprises a step for commanding remote actuation of a device for blocking the particles flowing in the flexible sleeve, this device being arranged to move the walls of the flexible sleeve, such as to reduce an effective cross-section of this sleeve.

This command step can occur during loading, or prior to loading. For example, it is possible to reduce the effective cross-section of the sleeve, such that when the tank is open, the sleeve is filled, then the method can comprise a step of commanding unblocking, such that the reduced effective cross-section of the sleeve increases. The particles filling the sleeve then fall towards the loading device. Therefore, it is possible to reach, without untimely fits and starts, a constant rate more quickly than if the tank was open onto a flexible sleeve that was not closed. In other words, the sleeve is preloaded with solid particles, such that, during the actual loading of the dispensing device, the constant rate is reached relatively quickly. This can allow for limiting the risk that some orifices of the dispensing device are hardly or not supplied during such a transition period, and therefore for a better guarantee of loading quality, which can be particularly advantageous in the case of dense loading.

To stop loading, it is possible to begin by closing a passage between the reserve of solid particles and the flexible sleeve, for example a valve of the hopper. The sleeve is then left to empty into the solid particle dispensing device.

For example, the method can comprise a step for commanding the inflation of a balloon placed between the flexible sleeve and a rigid pipe in which a part of the flexible sleeve is received, such as to press the flexible sleeve against the rigid product and therefore stop the flow.

Furthermore, a computer program product is proposed which comprises the instructions for carrying out the steps of the method described above when they are executed by a processor.

The method described above can, indeed, be implemented in a processor-type processing device, for example a microprocessor, a microcontroller, etc.

The invention will be better understood with reference to the figures, which illustrate embodiments given by way of example.

FIG. 1 schematically illustrates a loading assembly example according to an embodiment of the invention.

FIG. 2 schematically shows an example of a system for controlling a loading assembly according to an embodiment of the invention.

FIG. 3 schematically shows a balloon element example, for an assembly according to an embodiment of the invention.

FIG. 4 is a logical diagram illustrating a method example according to an embodiment of the invention.

Identical references can be used from one figure to another in order to designate elements that are identical or similar, in the shape thereof or in the function thereof.

With reference to FIG. 1, a reactor 100 defines an orifice 113 through which a dispensing device 110 for solid particles 107 passes.

The dispensing device 110 can be of the type described in the document WO 2010/076522.

This reactor 100 is approximately 5 or 6 meters high or more as the case may be, and the diameter of the base thereof is approximately 3 or 4 meters or even more.

The dispensing device 110 allows the reactor 100 to be loaded with inert beads (not shown), in the bottom of the reactor, then also with catalyst particles 107.

This type of reactor 100 can particularly be used in the oil or petrochemical industry. It can, for example, be a refining or petrochemical reactor (of a design that is well known to a person skilled in the art) wherein a load of hydrocarbons flows through the catalyst bed 107 and the inert bead bed which is not shown under temperature and pressure determined conditions. The catalyst solid particles can be porous extruded beads normally comprising metal compounds.

In this embodiment, blades 119, for example in the form of straps, placed at the outlet of the loading device 110 allow for better distribution of the solid particles in the reactor 100.

The dispensing device 110 defines orifices 118 through which the solid particles flow.

This dispensing device 110 comprises a main body 117 or drum, made from metal, and an extension pipe 114, also made of metal, or possibly made from a non-metal semi-rigid material, for supplying the dispensing device with solid particles. The extension pipe 114 is mounted on the drum 117 by means of hoops and tubes that are not shown.

The dispensing device 110 rests on a plate 150 of the reactor 100, by means of arms 133 mounted on the drum 117 and of ball and socket bases 134 at the end of the respective arms 133.

The dispensing device 110 is supplied with solid particles by a supply system 200. This supply system 200 comprises a flexible sleeve 140, for example a sleeve made from a flexible plastic, fabric, fibers, etc.

This flexible sleeve 140 is connected firstly to a solid particle reserve 130, for example a hopper, and secondly to the dispensing device 110 by standard means of connection that are not specific to the invention.

When an outlet valve 131 of the hopper 130 is open, the solid particles 107 can flow, as a result of gravity, into this flexible sleeve 140, and therefore reach the dispensing device 110.

A portion 141 of the flexible sleeve 140 is received in the extension pipe 114 and passes through this extension pipe 114.

The loading facility further includes a system 300 for controlling loading of the enclosure 100 with solid particles.

This control system 300 comprises a device 310 for blocking the particles flowing in the flexible sleeve 140. This blocking device 310 comprises, in this case, a balloon element 311 inserted between the portion 141 of the flexible sleeve, and the rigid walls of the extension pipe 114.

The balloon 311 is pneumatically connected to a single pipe 312. This pipe 312 is therefore used both for supplying the balloon with air, and evacuating the air coming from the balloon during deflation.

The control system 300 further includes a device 350 for actuating the blocking device 310. This actuating device 350, for example a computer, a smart phone, a programmable logic controller, etc., is remote from the blocking device 310. In particular, this actuating device can be located, and preferably is located, outside the enclosure 100. Therefore, it is no longer necessary for the operator to move inside the enclosure 100 in order to close the flexible sleeve 140.

The actuating device 350 can comprise a user interface, for example a keyboard, a screen, and/or another element.

A remote control console 351 (see FIG. 2) allows the pneumatic network 352 to be adjusted in order to inflate or deflate the balloon 311.

This remote control console 351 can be connected to an air admission pipe 353 and to an escape pipe 354 of the pneumatic network 352. This console 351 can comprise an air pressure reducing valve 355 to reduce the air pressure from the air admission pipe 353. Indeed, the balloon 311 can be designed such as to only tolerate relatively low pressures, for example less than or equal to 0.5 bar.

This air pressure reducing valve can therefore allow the air pressure from the pipe 353 to be changed from a value of 1 bar, for example to a value of 0.3 bar.

A "2/1" air distributor 356 allows the number of pipes connected to the balloon 311 to be reduced to 1. During the inflation of the balloon 311, this air distributor 356 pneumatically connects the pipe 312 and the pipe 353, the pipe 312 being isolated from the pipe 354. When, on the contrary, the aim is to deflate the balloon, the air distributor isolates the pipe 312 from the pipe 353 and connects the pipe 312 to the pipe 354.

In an alternative, it would be absolutely possible for the balloon to define an air inlet and outlet, which are separate from one another, an inlet pipe being connected to the air admission pipe 353 and the outlet pipe being connected to the air escape pipe 354, and/or to a vacuum pump. Two respective valves would allow the balloon to be inflated/deflated. Nevertheless, the solution of FIG. 2, wherein a single pipe is connected to the balloon 311, allows the spatial requirement to be limited in the enclosure, and particularly the spatial requirement at the manhole therefore allowing quick access to the plate if required.

When the operator enters data on the computer 350 to indicate an intention to close the sleeve 140, a command message is transmitted to the console 351 and the air distributor connects the pipe 312 to the pipe 353. The balloon 311 is therefore inflated, as a result of the air admission from this pipe 353. The inflation of this balloon 311 inside the extension pipe 114 presses the walls of the sleeve 140, at the portion 141, flat against the rigid walls of the extension pipe 114, therefore preventing the solid particles from passing towards the dispensing device 110.

In this embodiment, as in that of FIG. 3, the balloon 311 is obtained by welding two surfaces made from Kevlar®. In the deflated state, this balloon is, therefore, relatively flat. A sheet metal element 322 is placed inside this balloon 311.

Once the sleeve 140 has, therefore, been shut against the extension pipe 114, it is possible to reopen a flow path for the solid particles by commanding deflation of the balloon 311. If the operator enters such a command, the control console 351 then isolates the pipe 312 from the pipe 353, and connects this pipe 312 to the escape pipe 354, which is in fluid communication with a vacuum pump. The air present in the balloon 311 is then evacuated to this pipe 354. Since the balloon 311 is produced from rigid and relatively flat material, and is given structure by the sheet metal element 322, this balloon again assumes the original shape thereof. Furthermore, the sleeve 140 also again assumes the original shape thereof, i.e. the effective cross-section of this sleeve 140 at the balloon 311 increases, as a result of the choice of the material chosen for this sleeve 140 and/or since solid particles 107 tend to flow through this sleeve 140.

FIG. 3 shows a more precise example of a balloon element 311' according to an embodiment of the invention, this balloon element being slightly different to the balloon element also having the reference 311 in FIG. 1, particularly with regard to the air admission and fixation. This balloon comprises a sheet metal element 322' in order to give structure to and rigidify the balloon in the deflated state. Two threaded inserts 323 and a ¼ pipe piece 324 are welded onto this sheet metal element, these elements 323, 324 therefore being raised with respect to the plane of the sheet metal element 322'.

The threaded inserts 323 are blind and intended for fixing the balloon onto a rigid pipe of the type of pipe having reference 114 in FIG. 1.

The ¼ pipe piece 324 comes out on either side of the sheet metal element 322'. An air admission and escape pipe, of the type of pipe having reference 312 in FIGS. 1 and 2, can be fixed in a sealed manner on this pipe piece.

To manufacture the balloon, after welding the elements 323, 324 on the sheet metal element 322', fitting takes place of a first sheet of Kevlar® defining three openings at locations corresponding to the locations of the elements 323, 324 on the sheet metal element 322', then this sheet is welded about these elements 323, 324 by vulcanization. A second Kevlar® sheet is then placed on the other side of the sheet metal element 322', then also welded by vulcanization to the first sheet, on the respective contours thereof, such as to form a Kevlar® structure 425.

FIG. 4 shows an example of a method that can be executed by the computer 350.

Following the receipt of data entered by the user indicating that this user wishes to stop loading (step 401), the method comprises a step 413 of comparing this entered data with a value SHORT indicating that the stoppage will be short. If this test 413 is negative, i.e. if the user has entered data corresponding to a long or definitive stoppage, then the method comprises a step of transmitting a valve closure message close_131 to an actuator, that is not shown, of the valve having reference 131 in FIG. 1. Therefore, the first stage is to close the connection between the hopper 130 and the rest of the loading facility, during a step 410.

Then, the computer receives from a sensor, that is not shown, measurement values allowing it to be deduced whether the sleeve having reference 140 is emptied or not. If these measurements allow it to be deduced that the sleeve is emptied, then a flag s_empty is set to 1 during a step that is not shown.

The method comprises a test step 411 during which the value of this flag s_empty is compared with 1. So long as this value is equal to 0, the system is placed in a waiting state, during a step 412. In other words, these steps 411, 412 allow for a waiting time until the sleeve is completely emptied.

The detection that the sleeve is empty can be carried out by means of a sensor for the rotation speed of the blades 119 of the loading device 110. Indeed, when the sleeve 140 is emptied, it is expected that the rotation speed increases.

Once the sleeve is emptied, the system transmits a message for stopping the motor of the dispensing device 110, during a step 414, then the user enters a value for mass loaded into the enclosure M_lo and this value is received during a step 415 then stored in a memory during a step 416.

If, by contrast, the user has entered data indicating that the stoppage would be short, i.e. if the test 413 is positive, then the system 350 transmits to the console 351 a message for closing the sleeve 140, during a step 417.

Then, the pressure of the balloon is monitored in order to ensure the inflation thereof. A pressure value is received during a step 450. If this value is less than a threshold of 0.3 bar (test 451), a waiting step 452 is carried out. The steps 450, 451, 452 form a loop from which the system only emerges when the pressure reaches or exceeds this threshold value of 0.3 bar. It is possible to provide additional steps, which are not shown, in order to transmit a warning message if the system remains for too long in this loop.

This monitoring of the closure of the sleeve by means of a pressure sensor can be more advantageous than simple auditory monitoring, as can be envisaged in the prior art, since the operator can then be located further from the enclosure.

Once the closure of the sleeve has been detected, when the test 451 is negative, a test 418 is carried out with respect to a value of a flag relating to the filling level of the hopper 130. If the sensors allow for the detection that this hopper 130 is empty, then the flag 130_empty is set to 1. If the test 418 is positive, i.e. if the hopper 130 is assessed as being empty, then a message is displayed to invite the operator to fill this hopper 130, during a step that is not shown.

Furthermore, a new test step 419 with respect to the value of the flag 130_empty and a waiting step 420 allow the system to be placed in a waiting state so long as the hopper 130 is not filled.

The temporary stoppage of loading can therefore be taken advantage of in order to reload the hopper. The closure of the sleeve can allow the prevention of a transitional rate during which the loading of the enclosure would be carried out with a lesser throughput than with the constant rate.

If the test 418 or the test 419 shows that the hopper 130 is at least partially filled, then the operator enters a loaded mass value, and this value is received during a step 421.

Furthermore, it is possible to provide other steps of receiving measured values, for example values coming from sensors that are not shown in FIG. 1, for example level sensors for the bed of loaded particles 107.

Once this check of the quantity of loaded particles has been carried out, or, if required, once this filling of the hopper has been carried out, the system transmits a message for opening the sleeve, during a step 422. Loading then restarts.

The balloon 311 allows the sleeve 140 to be closed proximate the loading device 110, which can allow the insertion of solid particles into the enclosure to be stopped relatively quickly. Indeed, the particles present in the sleeve 140 before this closure at the portion 141 remain inside the sleeve 140 while the balloon is not deflated.

Returning to FIG. 4, it will, furthermore, be possible to provide, after the step 422, steps, that are not shown, for monitoring the pressure inside the balloon, in order to ensure the deflation thereof.

The logical diagram of FIG. 4 illustrates a process resulting in temporarily or definitively interrupting loading. To start loading, it will be possible to transmit a message to inflate the balloon 311 before opening the valve 131. In other words, once this valve 131 is open, the particles fill the sleeve 140. It is only when the sleeve is full that the command is given to deflate the balloon, and therefore the particles are allowed to move toward the dispensing device 110.

More precisely, the method can comprise a step for setting the orifices 118 of the dispensing device 110, a step for commanding switch-on of the motor such that the blades 119 rotate, a step for transmitting a message to close the sleeve 140, a step for transmitting a message to open the hopper by means of the valve 131, steps for waiting until the sleeve is full, a step for transmitting a message for opening the sleeve, and finally steps for setting the rotation speed of the dispensing device 110.

These various steps can be carried out on the computer 350, under the control of an operator located proximate this computer 350.

The invention claimed is:

1. A system comprising a refining and/or petrochemical reactor and an assembly for loading the refining and/or petrochemical reactor with solid particles, the assembly comprising
    a dispensing device for loading the reactor with solid particles, said device being arranged such as to homogenize and/or make uniform the loading of solid particles into the reactor,
    a system for supplying the dispensing device, said supply system comprising a flexible sleeve intended to be connected to a solid particle reserve firstly, and to the dispensing device secondly, wherein the solid particles can flow, generally from the top to the bottom,
    a system for controlling the supply system, comprising:
    a device for blocking the particles flowing in the flexible sleeve, which device is adjacent to a portion of the flexible sleeve and suitable for, when activated, moving walls of the flexible sleeve such as to reduce an effective cross-section of said sleeve at said portion, and
    a device for actuating the blocking device located remotely from the blocking device.

2. The system as claimed in claim 1, wherein the blocking device is arranged such as to urge the walls of the flexible sleeve against a rigid or semi-rigid pipe through which said flexible sleeve passes at the portion adjacent to the blocking device.

3. The system as claimed in claim 1, wherein the blocking device includes a balloon element pneumatically connected to a gas supply pipe.

4. The system as claimed in claim 3, wherein the balloon element is adapted to be connected to a pneumatic network by means of a single pipe.

5. The system as claimed in claim 3, wherein the balloon element comprises two planar parts made from flexible material, which are connected to one another in a sealed manner.

6. The system as claimed in claim 1, wherein the dispensing device comprises distributing means suitable for giving the solid particles a speed with a component perpendicular to the vertical direction.

7. The system as claimed in claim 6, wherein the distribution means comprise blades and a motor to rotate these blades about a vertical axis.

8. A method of managing loading of a refining and/or petrochemical reactor with catalyst particles and/or inert beads, comprising installing the assembly as claimed in claim 1 in the refining and/or petrochemical reactor.

9. The system as claimed in claim 1, wherein the reactor has an opening for the loading.

10. The system as claimed in claim 9, wherein the dispensing device is placed through this opening into the reactor and loads with a rain effect the reactor with solid particles comprising catalyst particles and/or inert beads.

11. The system as claimed in claim 1, wherein the actuating device is located at a distance from the blocking device that is greater than or equal to the radius of the base of the reactor.

* * * * *